(12) United States Patent
Hung

(10) Patent No.: US 9,278,040 B2
(45) Date of Patent: Mar. 8, 2016

(54) MEDICAL CART

(71) Applicant: Modernsolid Industrial Co., Ltd., Taichung (TW)

(72) Inventor: Chin-Jui Hung, Taichung (TW)

(73) Assignee: Modernsolid Industrial Co., Ltd., Taichung (TW)

( * ) Notice: Subject to any disclaimer, the term of this patent is extended or adjusted under 35 U.S.C. 154(b) by 193 days.

(21) Appl. No.: 14/156,524

(22) Filed: Jan. 16, 2014

(65) Prior Publication Data

US 2014/0218282 A1     Aug. 7, 2014

(30) Foreign Application Priority Data

Feb. 1, 2013  (TW) ............................. 102202314 U

(51) Int. Cl.
  *B62B 3/02* (2006.01)
  *A61G 12/00* (2006.01)
  *G06F 3/01* (2006.01)

(52) U.S. Cl.
  CPC ................ *A61G 12/001* (2013.01); *B62B 3/02* (2013.01); *G06F 3/01* (2013.01); *B62B 2202/56* (2013.01); *B62B 2206/06* (2013.01)

(58) Field of Classification Search
  CPC .......... B62B 3/02; B62B 3/002; B62B 3/004; B62B 3/005; B62B 2203/07; B62B 2203/10; A47B 9/04; A47B 9/046; A47B 6/06; A47B 9/065; A47B 2200/0056–2200/006
  See application file for complete search history.

(56) References Cited

U.S. PATENT DOCUMENTS

| | | | | |
|---|---|---|---|---|
| 5,224,429 A * | 7/1993 | Borgman | .................. | A47B 9/00 108/147 |
| 6,286,441 B1 * | 9/2001 | Burdi | ........................ | A47B 9/00 108/147 |
| 6,530,740 B2 * | 3/2003 | Kim | ........................ | B62B 1/002 180/251 |
| 6,595,144 B1 * | 7/2003 | Doyle | ....................... | A47B 9/00 108/147 |
| 6,705,239 B2 * | 3/2004 | Doyle | ....................... | A47B 9/04 108/147 |
| 7,249,771 B1 * | 7/2007 | Brennan | .............. | A47J 37/0704 280/35 |
| 7,439,694 B2 * | 10/2008 | Atlas | ........................ | A47B 9/04 108/146 |
| 7,594,668 B2 * | 9/2009 | Arceta | .................. | A61G 12/001 108/147.19 |
| 8,240,684 B2 * | 8/2012 | Ross | .................. | A61M 16/0051 280/47.34 |

(Continued)

*Primary Examiner* — Katy M Ebner
(74) *Attorney, Agent, or Firm* — Trop Pruner & Hu, P.C.

(57) ABSTRACT

A medical cart includes a cart body, a top platform, and an elevating device. The elevating device is mounted on the cart body for supporting the top platform above the cart body and is for moving the top platform upwardly and downwardly. The elevating device includes a sleeve, a screw rod, a motor and a motor driving module. The screw rod extends through the sleeve and engages threadedly a threaded inner surface of the sleeve. The motor is connected to the screw rod and is for driving the screw rod to rotate and move with respect to the sleeve, such that the top platform is driven by the screw rod to move upwardly and downwardly with respect to the cart body.

6 Claims, 4 Drawing Sheets

(56) References Cited

U.S. PATENT DOCUMENTS

| | | | | |
|---|---|---|---|---|
| 8,522,695 B2 * | 9/2013 | Ellegaard | ............... | A47B 9/00 108/144.11 |
| 8,714,569 B2 * | 5/2014 | Lu | ............... | F16M 13/02 280/35 |
| 8,864,149 B2 * | 10/2014 | Stryker | ............... | A61G 12/001 280/47.35 |
| 9,039,016 B2 * | 5/2015 | Abernethy | ............... | B62B 3/02 280/6.15 |
| 9,089,318 B2 * | 7/2015 | Henniges | ............... | A61B 19/0248 |
| 2009/0155033 A1 * | 6/2009 | Olsen | ............... | B62B 3/08 414/462 |
| 2010/0213679 A1 * | 8/2010 | Smith | ............... | A47B 21/00 280/47.35 |
| 2011/0061570 A1 * | 3/2011 | Klinke | ............... | A47B 9/20 108/20 |
| 2011/0068562 A1 * | 3/2011 | Keffeler | ............... | A61G 12/001 280/651 |
| 2011/0272901 A1 * | 11/2011 | Inderbitzin | ............... | A61G 12/001 280/29 |
| 2012/0080857 A1 * | 4/2012 | Smith | ............... | A45C 5/14 278/29 |
| 2012/0126503 A1 * | 5/2012 | Butler | ............... | A61B 19/0248 280/47.35 |
| 2013/0307237 A1 * | 11/2013 | Chen | ............... | A61G 12/001 280/35 |
| 2014/0117635 A1 * | 5/2014 | Ninomiya | ............... | A61B 8/4405 280/35 |
| 2014/0152068 A1 * | 6/2014 | Hille | ............... | A47C 20/041 297/362.11 |
| 2014/0265254 A1 * | 9/2014 | Sekine | ............... | B66F 9/07586 280/638 |
| 2014/0374680 A1 * | 12/2014 | Tsang | ............... | B66F 5/025 254/7 C |

* cited by examiner

US 9,278,040 B2

MEDICAL CART

CROSS-REFERENCE TO RELATED APPLICATION

This application claims priority of Taiwanese Application No. 102202314, filed on Feb. 1, 2013.

BACKGROUND OF THE INVENTION

1. Field of the Invention

This invention relates to a medical cart, more particularly to a medical cart including an elevating device.

2. Description of the Related Art

A conventional medical cart disclosed in WO 2005072638A1 includes a cart body and a top platform mounted fixedly on the cart body. However, the height of the top platform is not adjustable with respect to the cart body in accordance with various body heights of different users. Thus, it is inconvenient for a user with a body height unsuitable for the height of the top platform to use the medical cart.

SUMMARY OF THE INVENTION

The object of the present invention is to provide a medical cart that has an elevating device for adjusting height of a top platform of the medical cart.

According to this invention, a medical cart includes a cart body, a top platform and a mechatronics unit. The mechatronics unit includes an elevating device mounted on the cart body for supporting the top platform above the cart body and operable to move the top platform upwardly and downwardly with respect to the cart body. The elevating device includes a sleeve, a screw rod, a first motor, a first motor driving module and a first control module. The sleeve is mounted on the cart body and has a threaded inner surface. The screw rod extends through the sleeve and engages threadedly the threaded inner surface. The first motor is connected to the screw rod and is operable to drive the screw rod to rotate and move with respect to the sleeve. The top platform is driven by the screw rod to move upwardly and downwardly with respect to the cart body. The first motor driving module is electrically connected to the first motor and is operable to output a first driving signal thereto for driving operation of the first motor. The first control module is electrically connected to the first motor driving module and is operable to control operation of the first motor driving module to output the first driving signal in response to user input of one of a lifting signal and a lowering signal that are indicative of upward movement and downward movement of the top platform, respectively.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
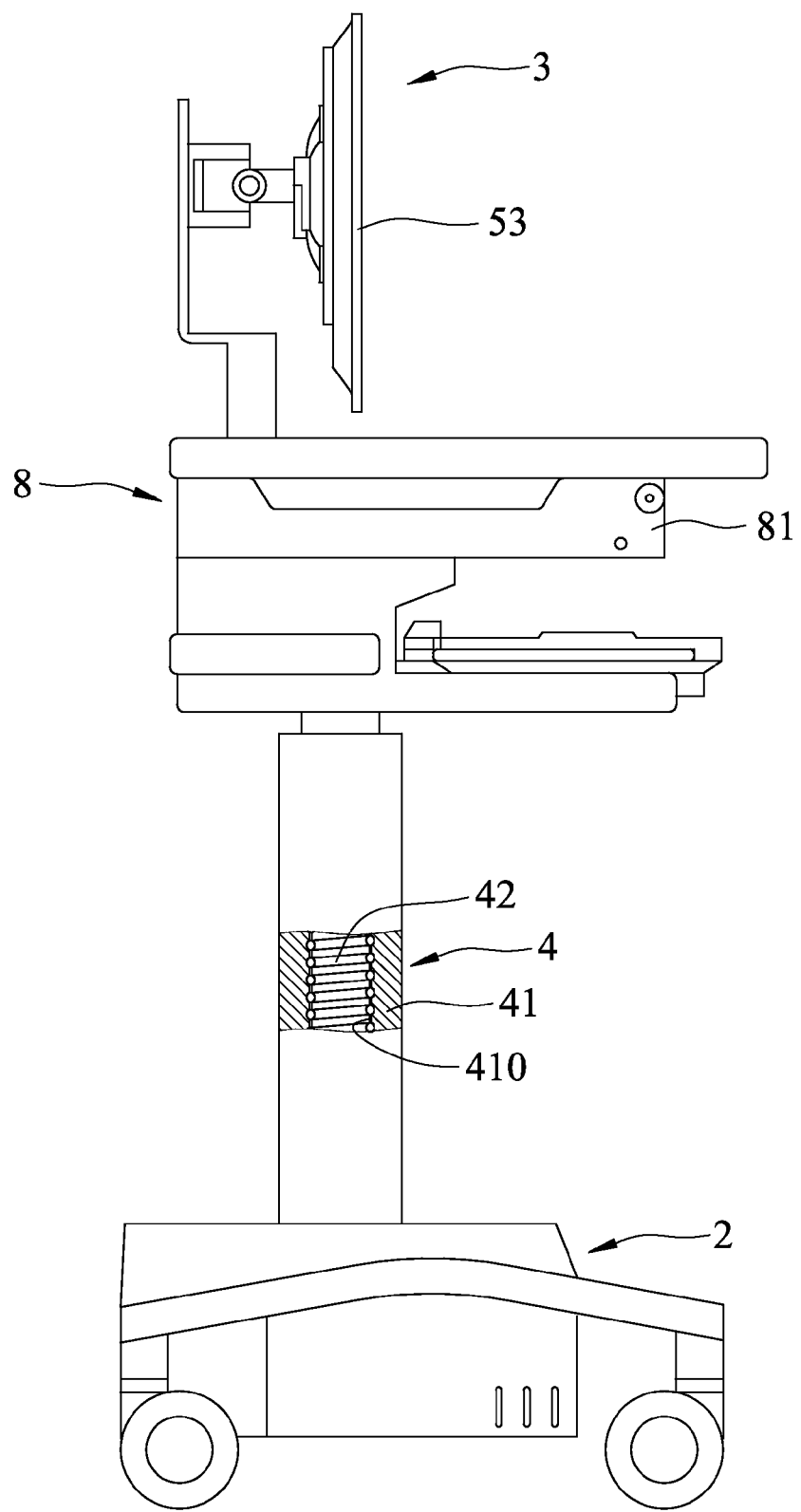
FIG. 1 is a schematic side view of a preferred embodiment of a medical cart according to the present invention.
Figure 2:
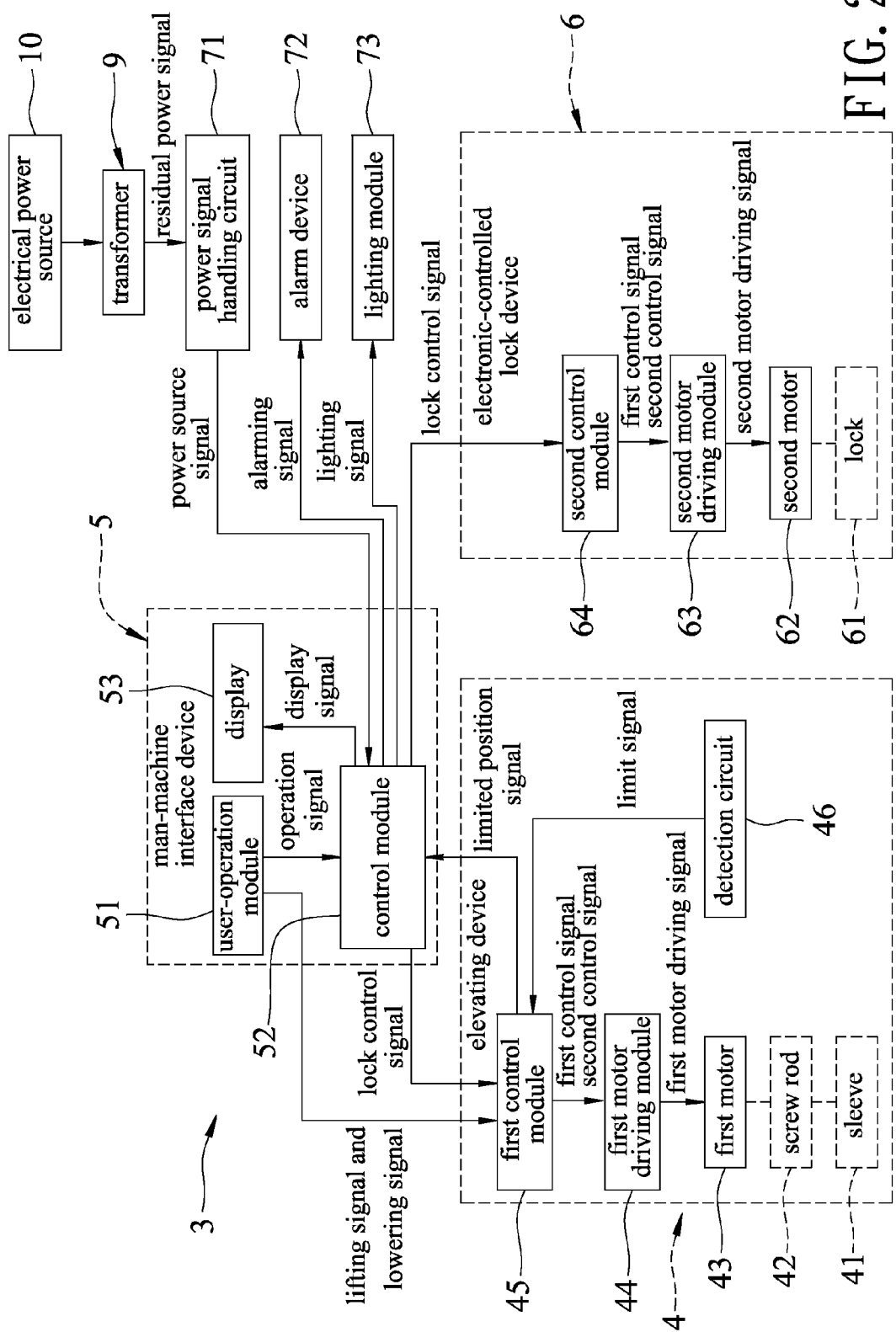
FIG. 2 is a block diagram of the medical cart of the preferred embodiment.

Referring to FIGS. 1 and 2, the preferred embodiment of a medical cart according to the present invention is shown to include a cart body 2, a top platform 8, and a mechatronics unit 3. The mechatronics unit 3 includes an elevating device 4, a man-machine interface device 5, an electronic-controlled lock device 6, a power signal handling circuit 71, an alarm device 72, a lighting module 73, a transformer 9, and an electrical power source 10 (e.g., rechargeable battery).

The elevating device 4 is mounted on the cart body 2 for supporting the top platform 8 above the cart body 2, and is operable to move the top platform 8 upwardly and downwardly with respect to the cart body 2. The elevating device 4 includes a sleeve 41, screw rod 42, a first motor 43, a first motor driving module 44, a first control module 45 and a detection circuit 46. The sleeve 41 is mounted on the cart body 2 and has a threaded inner surface 410. The screw rod 42 extends through the sleeve 41 and engages threadedly the threaded inner surface 410. The first motor 43 is connected to the screw rod 42, and is operable to drive the screw rod 42 to rotate and move with respect to the sleeve 41. The top platform 8 is coupled to and driven by the screw rod 42 to move upwardly and downwardly with respect to the cart body 2. The first motor driving module 44 is electrically connected to the first motor 43, and is operable to output a first driving signal thereto for driving operation of the first motor 43.

The first control module 45 is electrically connected to the first motor driving module 44, and is operable, in response to user input of one of a lifting signal and a lowering signal, to output a first control signal and a second control signal for controlling the first motor driving module 44 to output the first driving signal. The lifting signal and the lowering signal are indicative of upward movement and downward movement of the top platform 8, respectively. The detection circuit 46 is electrically connected to the first control module 45, and is operable to detect a position of the screw rod 42 and to output a limit signal to the first control module 45 when the screw rod 42 is at a limited position. In this preferred embodiment, the detection circuit 46 is a reed switch, and the limited position of the screw rod 42 may be, but should not be limited to, one of the highest and lowest positions of the screw rod 42.

The first control module 45 is further operable, in response to receipt of the limit signal, to enable the first motor driving module 44 to stop the first motor 43, and to output a limited position signal to the control module 52.

Figure 3:
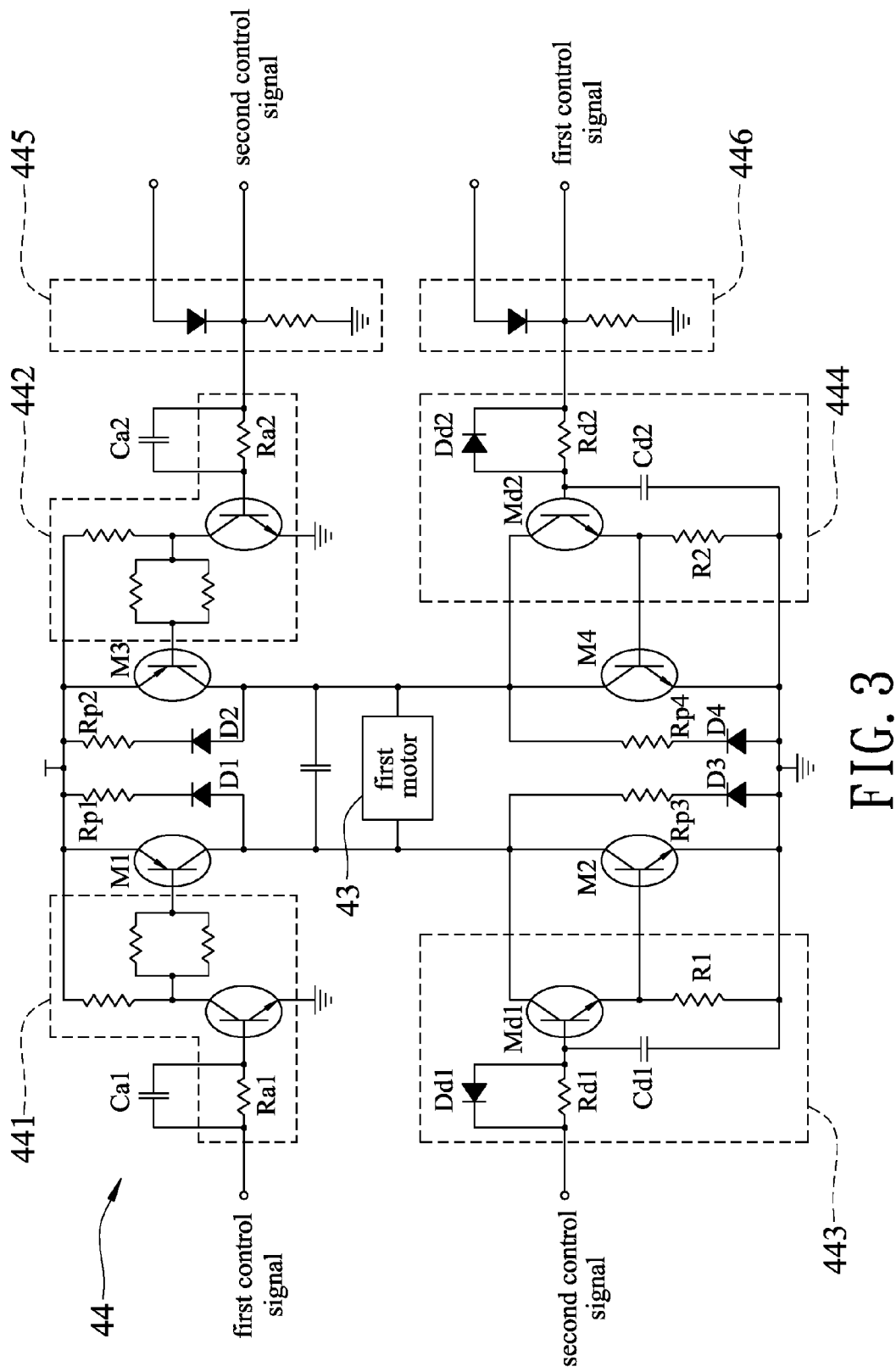
FIG. 3 is a circuit diagram of a first motor driving module of the medical cart.

Further referring to FIG. 3, a circuit diagram of the first motor driving module 44 is shown. Note that the first control signal is a complement of the second control signal. The first motor driving module 44 includes a first switch (M1), a second switch (M2), a third switch (M3), a fourth switch (M4), a first speed-up capacitor (Ca1), a first base resistor (Ra1), a second speed-up capacitor (Ca2), a second base resistor (Ra2), a first inverting circuit 441, a second inverting circuit 442, a first delay circuit 443 and a second delay circuit 444.

The first and second switches (M1) and (M2) are connected to each other in series. Each of the first and second switches (M1) and (M2) is operable, in response to a respective one of the first and second control signals, to switch between conducting and non-conducting states. A common node between the first and second switches (M1) and (M2) is electrically connected to one terminal of the first motor 43.

The third and fourth switches (M3) and (M4) are connected to each other in series. Each of the third and fourth switches (M3) and (M4) is operable, in response to a respective one of the second and first control signals, to switch between conducting and non-conducting states. A common node between the third and fourth switches (M3) and (M4) is electrically connected to another terminal of the first motor 43.

The first speed-up capacitor (Ca1) and the first base resistor (Ra1) are connected to each other in parallel. The first speed-up capacitor (Ca1) includes a first end for receiving the first control signal and a second end coupled to the first switch (M1) for decreasing switching time of the first switch (M1) between the conducting and non-conducting states. When the first control signal varies from low voltage to high voltage, the first speed-up capacitor (Ca1) provides a charging current to decrease the switching time of the first switch (M1) from the non-conducting state to the conducting state. When the first control signal varies from high voltage to low voltage, the first speed-up capacitor (Ca1) provides a reverse voltage to decrease the switching time of the first switch (M1) from the conducting state to the non-conducting state.

The second speed-up capacitor (Ca2) and the second base resistor (Ra2) are connected to each other in parallel. The second speed-up capacitor (Ca2) includes a first end for receiving the second control signal and a second end coupled to the third switch (M3) for decreasing switching time of the third switch (M3) between the conducting and non-conducting states. Further details of the second speed-up capacitor (Ca2) for switching of the third switch (M3) are similar to those of the first speed-up capacitor (Ca1) and are thus omitted for the sake of brevity.

The first inverting circuit 441 is electrically connected between the first switch (M1) and the second end of the first speed-up capacitor (Ca1). The second inverting circuit 442 is electrically connected between the third switch (M3) and the second end of the second speed-up capacitor (Ca2).

The first delay circuit 443 is for receiving the second control signal and is for delaying output of the second control signal to the second switch (M2) so as to decrease switching speed of the second switch (M2) to the conducting state and to amplify a current of the second control signal to be received by the second switch (M2). By this way, the second switch (M2) is saturated when switched to the conducting state.

The first delay circuit 443 includes a first delay resistor (Rd1), a first free-wheeling diode (Dd1), a first delay transistor (Md1), a first resistor (R1), and a first delay capacitor (Cd1).

The first delay resistor (Rd1) and the first free-wheeling diode (Dd1) are connected to each other in parallel. The first delay resistor (Rd1) has a first end for receiving the second control signal and a second end. The first delay transistor (Md1) and the first resistor (R1) are electrically connected to each other in series and between the second end of the first delay resistor (Rd1) and ground. A common node between the first delay transistor (Md1) and the first resistor (R1) is electrically connected to the second switch (M2). The first delay capacitor (Cd1) is electrically connected between the second end of the first delay resistor (Rd1) and the ground, and has a capacitance related to the second control signal. Preferably, the greater the capacitance of the first delay capacitor (Cd1), the longer delay of the second control signal. The first free-wheeling diode (Dd1) is provided for discharge of the first delay capacitor (Cd1) when the second control signal varies from high voltage to low voltage.

The second delay circuit 444 is for receiving the first control signal and is for delaying output of the first control signal to the fourth switch (M4) so as to decrease switching speed of the fourth switch (M4) to the conducting state and to amplify a current of the first control signal to be received by the fourth switch (M4). By this way, the fourth switch (M4) is saturated when switched to the conducting state.

The second delay circuit 444 includes a second delay resistor (Rd2), a second free-wheeling diode (Dd2), a second delay transistor (Md2), a second resistor (R2) and a second delay capacitor (Cd2).

The second delay resistor (Rd2) and the second free-wheeling diode (Dd2) are connected to each other in parallel. The second delay resistor (Rd2) has a first end for receiving the first control signal and a second end. The second delay transistor (Md2) and the second resistor (R2) are electrically connected to each other in series and between the second end of the second delay resistor (Rd2) and the ground. A common node between the second delay transistor (Md2) and the second resistor (R2) is electrically connected to the fourth switch (M4). The second delay capacitor (Cd2) is electrically connected between the second end of the second delay resistor (Rd2) and the ground and has a capacitance related to the first control signal. Preferably, the greater the capacitance of the second delay capacitor (Cd2), the longer delay of the first control signal. The second free-wheeling diode (Dd2) is provided for discharge of the second delay capacitor (Cd2) when the first control signal varies from high voltage to low voltage.

The first motor driving module 44 further includes a first protecting circuit 445, a second protecting circuit 446, four free-wheeling diodes (D1, D2, D3, D4), and four protection resistors (Rp1, Rp2, Rp3, Rp4). The first and second protection circuits 445, 446 are respectively and electrically connected to the first end of the second speed-up capacitor (Ca2) and the first end of the second delay resistor (Rd2) to prevent damage of abovementioned logic elements when a programmable logic controller (PLC) (not shown) outputs test signals for testing of the first motor driving module 44.

Each of the free-wheeling diodes (D1, D2, D3, D4) is in series connection with a respective one of the four protection resistors (Rp1, Rp2, Rp3, Rp4), and each of the first, second, third and fourth switches (M1, M2, M3, M4) is in parallel connection with the series connection of one of the free-wheeling diodes (D1, D2, D3, D4) and a corresponding one of the protection resistors (Rp1, Rp2, Rp3, Rp4).

By virtue of the first and second speed-up capacitors (Ca1, Ca2) and the first and second delay circuits 443, 444, the first motor 43 can be turned off rapidly, and turned on slowly. Thus, overshooting of the first driving signal that drives operation of the first motor 43 can be prevented.

Referring again to FIGS. 1 and 2, the man-machine interface device 5 of the mechatronics unit 3 includes a user-operation module 51, a control module 52, and a display 53. The user-operation module 51 is for outputting an operation signal, the lifting signal and the lowering signal in response to user operation. In this embodiment, the user-operation module 51 includes a plurality of buttons (not shown) accessible to users, but the present invention is not limited in this respect.

The control module 52 is coupled to the user-operation module 51 for outputting a display signal to be received by the display 53 in response to receipt of the operation signal, the limited position signal and a power source signal, and for outputting a lighting signal to the lighting module 73 for controlling operation of the lighting module 73 in response to receipt of the operation signal.

The display 53 is disposed on the top platform 8, and is coupled to the control module 52 for receiving the display signal to display information accordingly.

When the position of the screw rod 42 is at the limited position, i.e., the highest position or the lowest position, the detection circuit 46 outputs the limit signal to the first control module 45. Then, the first control module 45 outputs the limited position signal to the control module 52, and enables the first motor driving module 44 to stop the first motor 43.

The display 53 displays the information about the limited position according to the display signal outputted by the control module 52 in response to receipt of the limited position signal.

The power source signal is outputted by the power signal handling circuit 71 according to a residual power signal that is outputted from the transformer 9 and that is indicative of a residual power of the electrical power source 10 which supplies power to the medical cart. The control module 52 is electrically connected to the alarm device 72, and further outputs an alarm signal in response to receipt of the power source signal. the alarm signal is received by the alarm device 72, which notifies the user when the residual power of the electrical power source 10 falls below a predetermined threshold. The alarm device 72 is a buzzer in this embodiment, but is not limited thereto.

The electronic-controlled lock device 6 includes a lock 61 for locking a medicine chest 81 of the top platform 8, a second motor 62, a second motor driving module 63, and a second control module 64. In this embodiment, the lock 61 is a micro switch but the present invention is not limited in this respect.

The second motor 62 is connected to the lock 61, and is operable to lock and unlock the lock 61. The second motor driving module 63 is electrically connected to the second motor 62, and is operable to output a second driving signal thereto for driving operation of the second motor 62.

The second control module 64 is electrically connected to the second motor driving module 63 and the control module 52 that further outputs a lock control signal in response to receipt of the operation signal. The second control module 64 is operable to output a first control signal and a second control signal for controlling the second motor driving module 63 to output the second driving signal according to the lock control signal.

It should be noted that the first control module 45 is further operable, in response to receipt of the lock control signal from the control module 52 for unlocking the lock 61, to enable the first motor driving module 44 to stop the first motor 43. By this way, when the medicine chest 81 is unlocked, the screw rod 42 cannot be driven to rotate and move with respect to the sleeve 41 to thereby prevent the contents in the medicine chest 81 from falling out.

Figure 4:
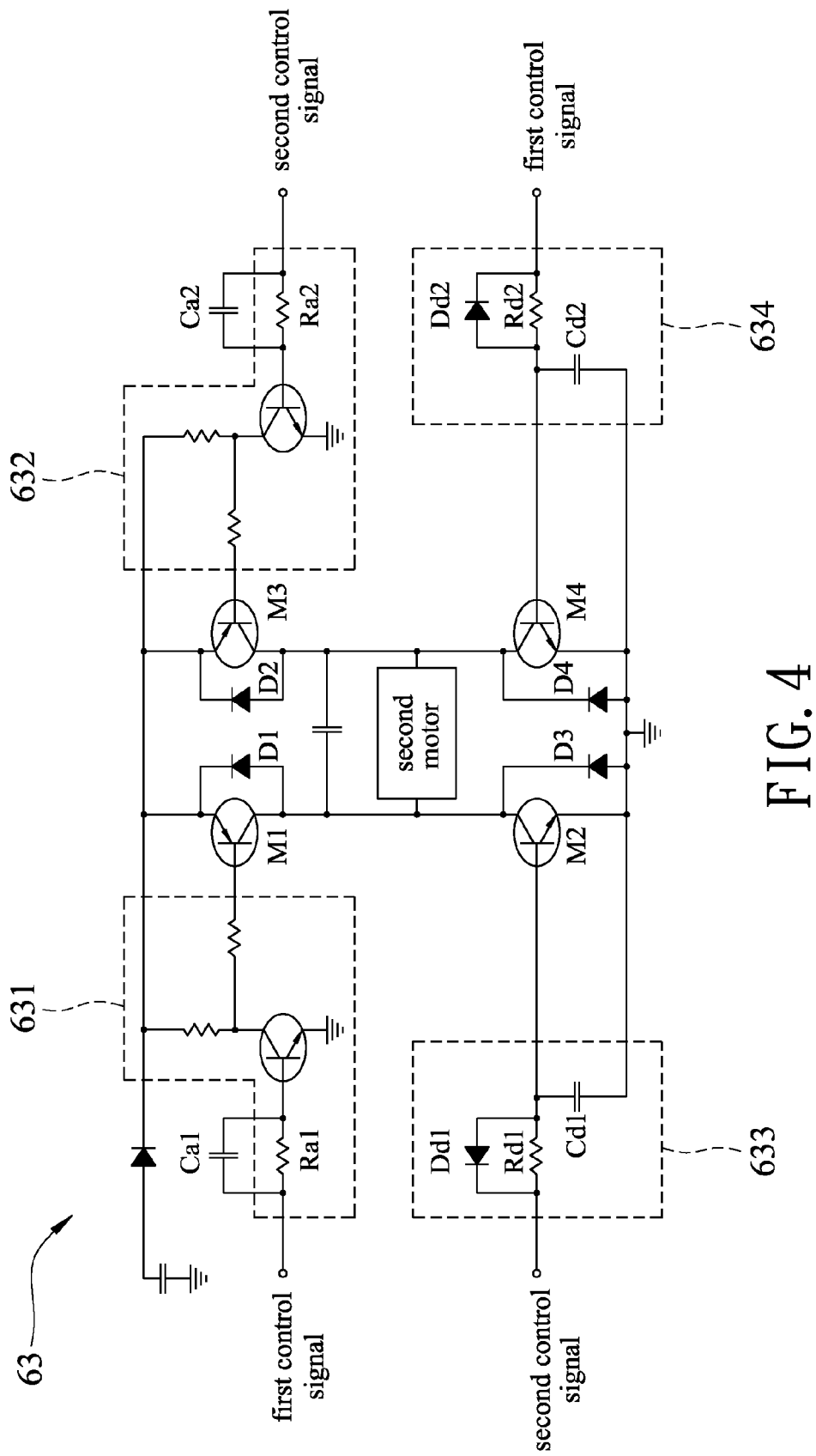
FIG. 4 is a circuit diagram of a second motor driving module of the medical cart.

Further referring to FIG. 4, a circuit diagram of the second motor driving module 63 is shown. The first control signal is a complement of the second control signal. The second motor driving module 63 is similar to the first motor driving module 44 except that the first and second delay transistors (Md1, Md2) and the first and second resistors (R1, R2) of the first and second delay circuits 443, 444 illustrated in FIG. 3 are omitted herein. The second motor driving module 63 includes a first inverting circuit 631, a second inverting circuit 632, a first delay circuit 633 and a second delay circuit 634.

The first delay circuit 633 includes a first delay resistor (Rd1), a first free-wheeling diode (Dd1), and a first delay capacitor (Cd1). The first delay resistor (Rd1) and the first free-wheeling diode (Dd1) are connected to each other in parallel. The first delay resistor (Rd1) has a first end for receiving the second control signal, and a second end. The first delay capacitor (Cd1) is electrically connected between the second end of the first delay resistor (Rd1) and the ground and has a capacitance related to the second control signal. Preferably, the greater the capacitance of the first delay capacitor (Cd1), the longer delay of the second control signal. The first free-wheeling diode (Dd1) is provided for discharge of the first delay capacitor (Cd1) when the second control signal varies from high voltage to low voltage.

The second delay circuit 634 includes a second delay resistor (Rd2), a second free-wheeling diode (Dd2) and a second delay capacitor (Cd2). The second delay resistor (Rd2) and the second free-wheeling diode (Dd2) are connected to each other in parallel. The second delay resistor (Rd2) has a first end for receiving the first control signal, and a second end. The second delay capacitor (Cd2) is electrically connected between the second end of the second delay resistor (Rd2) and the ground and has a capacitance related to the first control signal. Preferably, the greater the capacitance of the second delay capacitor (Cd2), the longer delay of the first control signal. The second free-wheeling diode (Dd2) is provided for discharge of the second delay capacitor (Cd2) when the first control signal varies from high voltage to low voltage.

The first and second delay circuits 633, 634 are respectively provided for decreasing switching speed of the second and the fourth switches (M2, M4) to the conducting state and to respectively amplify current of the second and first control signals to be received by the respective second and fourth switches (M2, M4). By this way, the second and fourth switches (M2, M4) are saturated when switched to the conducting state.

Similarly, the electronic-controlled lock device 6 can be controlled using the buttons of the user-operation module 51. The second motor 62 can be turned off rapidly, and turned on slowly. Thus, overshooting of the second driving signal that drives operation of the second motor 62 can be prevented.

To sum up, by virtue of the elevating device 4, the top platform 8 can be moved upwardly and downwardly with respect to the cart body 2 by operation of the user-operation module 51 so as to adapt to various body heights of different users. Further, the configurations of the first and second motor driving modules 44, 63 respectively enable the first and second motors 43, 62 to be switched off rapidly and switched on slowly.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:
1. A medical cart comprising:
   a cart body;
   a top platform; and
   a mechatronics unit including an elevating device that is mounted on said cart body for supporting said top platform above said cart body and that is operable to move said top platform upwardly and downwardly with respect to said cart body, said elevating device including
   a sleeve mounted on said cart body and having a threaded inner surface,
   a screw rod extending through said sleeve and engaging threadedly said threaded inner surface,
   a first motor connected to said screw rod, and operable to drive said screw rod to rotate and move with respect to said sleeve, said top platform being driven by said screw rod to move upwardly and downwardly with respect to said cart body,
   a first motor driving module electrically connected to said first motor, and operable to output a first driving signal thereto for driving operation of said first motor, and
   a first control module electrically connected to said first motor driving module, and operable to control operation of said first motor driving module to output the first driving signal in response to user input of one of a lifting signal and a lowering signal that are indicative of upward movement and downward movement of said top platform, respectively;

wherein said first control module is operable to output a first control signal and a second control signal for controlling said first motor driving module, said first motor driving module including:

a first switch and a second switch connected to each other in series, each of said first and second switches being operable, in response to a respective one of the first and second control signals, to switch between conducting and non-conducting states, a common node between said first and second switches being electrically connected to one terminal of said first motor;

a third switch and a fourth switch connected to each other in series, each of said third and fourth switches being operable, in response to a respective one of the second and first control signals, to switch between conducting and non-conducting states, a common node between said third and fourth switches being electrically connected to another terminal of said first motor;

a first speed-up capacitor and a first base resistor connected to each other in parallel, said first speed-up capacitor including a first end for receiving the first control signal and a second end coupled to said first switch for decreasing switching time of said first switch between the conducting and non-conducting states, a second speed-up capacitor and a second base resistor connected to each other in parallel, said second speed-up capacitor including a first end for receiving the second control signal and a second end coupled to said third switch for decreasing switching time of said third switch between the conducting and non-conducting states;

a first inverting circuit electrically connected between said first switch and said second end of said first speed-up capacitor; and a second inverting circuit electrically connected between said third switch and said second end of said second speed-up capacitor.

2. The medical card as claimed in claim 1, wherein said first motor driving module further includes:

a first delay circuit for receiving the second control signal and for delaying output of the second control signal to said second switch, said first delay circuit including a first delay resistor and a first free-wheeling diode connected to each other in parallel, said first delay resistor having a first end for receiving the second control signal, and a second end, a first delay transistor and a first resistor electrically connected to each other in series and between said second end of said first delay resistor and ground, a common node between said first delay transistor and said first resistor being electrically connected to said second switch, and a first delay capacitor electrically connected between said second end of said first delay resistor and the ground, and having a capacitance related to the second control signal; and a second delay circuit for receiving the first control signal and for delaying output of the first control signal to said fourth switch, said second delay circuit including a second delay resistor and a second free-wheeling diode connected to each other in parallel, said second delay resistor having a first end for receiving the first control signal, and a second end, a second delay transistor and a second resistor electrically connected to each other in series and between said second end of said second delay resistor and the ground, a common node between said second delay transistor and said second resistor being electrically connected to said fourth switch, and a second delay capacitor electrically connected between said second end of said second delay resistor and the ground, and having a capacitance related to the first control signal.

3. The medical cart as claimed in claim 1, wherein said mechatronics unit further includes:

a man-machine interface device including a user-operation module for outputting an operation signal, the lifting signal and the lowering signal in response to user operation, a control module coupled to said user-operation module for outputting a display signal in response to receipt of the operation signal, and a display disposed on said top platform and coupled to said control module for receiving the display signal to display information accordingly.

4. The medical cart as claimed in claim 3, wherein said top platform includes a medicine chest, and said mechatronics unit further includes:

an electronic-controlled lock device including a lock for locking said medicine chest, a second motor connected to said lock and operable to lock and unlock said lock, a second motor driving module electrically connected to said second motor, and operable to output a second driving signal thereto for driving operation of said second motor, and a second control module electrically connected to said control module of man-machine interface device and said second motor driving module, and operable to control operation of said second motor driving module to output the second driving signal according to a lock control signal, which is outputted by said control module according to the operation signal.

5. The medical cart as claimed in claim 4, wherein said first control module is further operable, in response to receipt of the lock control signal from said control module for unlocking said lock, to enable said first motor driving module to stop said first motor.

6. The medical cart as claimed in claim 3, wherein said elevating device further includes a detection circuit that is electrically connected to said first control module, and that is operable to detect a position of said screw rod and to output a limit signal to said first control module when said screw rod is at a limited position, wherein said first control module is further operable, in response to receipt of the limit signal, to enable said first motor driving module to stop said first motor, and to output a limited position signal to said control module which is operable to output the display signal according to the limited position signal to said display for displaying the information about the limited position.

* * * * *